United States Patent
Browne

[11] Patent Number: 5,666,134
[45] Date of Patent: *Sep. 9, 1997

[54] ELECTROMAGNETIC SHUTTER

[75] Inventor: John Browne, Oakville, Canada

[73] Assignee: Mark IV Industries Limited, Ontario, Canada

[*] Notice: The portion of the term of this patent subsequent to Aug. 9, 2011, has been disclaimed.

[21] Appl. No.: 241,697

[22] Filed: May 12, 1994

Related U.S. Application Data

[63] Continuation-in-part of Ser. No. 855,063, Mar. 20, 1992, Pat. No. 5,337,077.
[51] Int. Cl.[6] .................................................. G09G 3/16
[52] U.S. Cl. .................................... 345/109; 345/110
[58] Field of Search ........................ 345/108, 109, 345/110, 111; 340/815.05, 815.16, 815.27, 815.26; 40/447, 449, 452

[56] References Cited

U.S. PATENT DOCUMENTS

| | | | |
|---|---|---|---|
| 4,417,241 | 11/1983 | Wakatake | 345/111 |
| 4,769,638 | 9/1988 | Woolfolk | 345/111 |
| 4,914,427 | 4/1990 | Trunk | 345/111 |
| 5,021,773 | 6/1991 | Browne | 345/111 |
| 5,050,325 | 9/1991 | Browne | 345/111 |
| 5,055,832 | 10/1991 | Browne | 345/110 |
| 5,337,077 | 8/1994 | Browne | 345/109 |

*Primary Examiner*—Richard Hjerpe
*Assistant Examiner*—Xiao M. Wu
*Attorney, Agent, or Firm*—Robert L. Westell

[57] ABSTRACT

A shutter is designed for use with an optic fibre which is designed to emit rays in a cone in a selected viewing direction. A mount carries the optic fibre to emit such cone. Associated with the mount is structure for rotatably mounting the shutter, or rotor to rotate between ON and OFF positions. The shutter is shaped to provide a panel which blocks the cone in the viewing direction in the OFF position. The shutter is shaped to define, in an ON position, a central opening for passage of the cone of light in the viewing direction. Rotation between ON and the OFF positions is about 90°. An Electromagnetic drive is used to drive the shutter between the ON and OFF positions. The fibre is centrally located relative to the fibre mount. A plurality of shutters, each with its own drive may be arranged in line, in a single strip module.

19 Claims, 3 Drawing Sheets

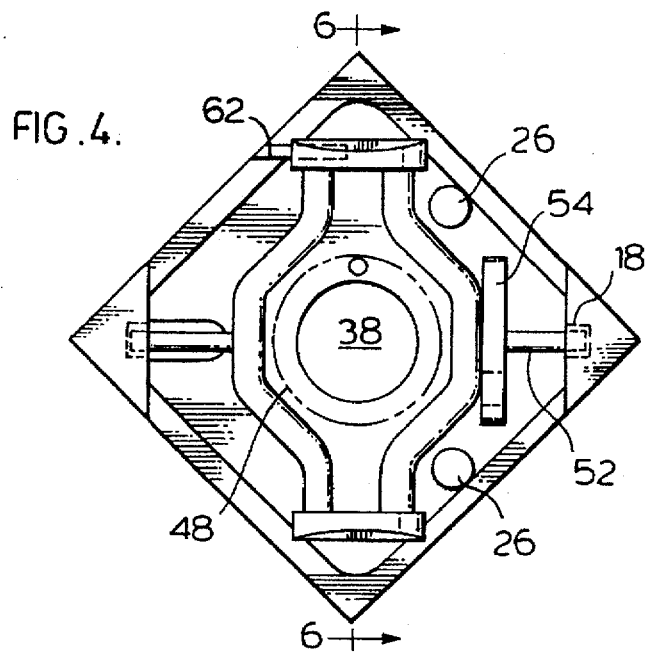
FIG. 4.
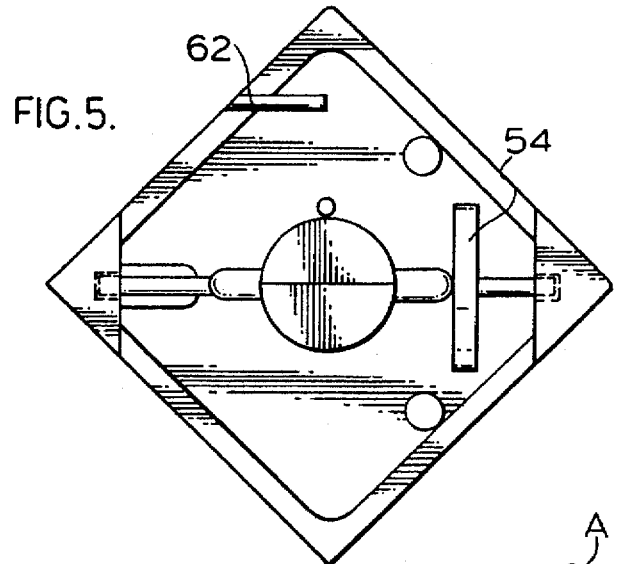
FIG. 5.
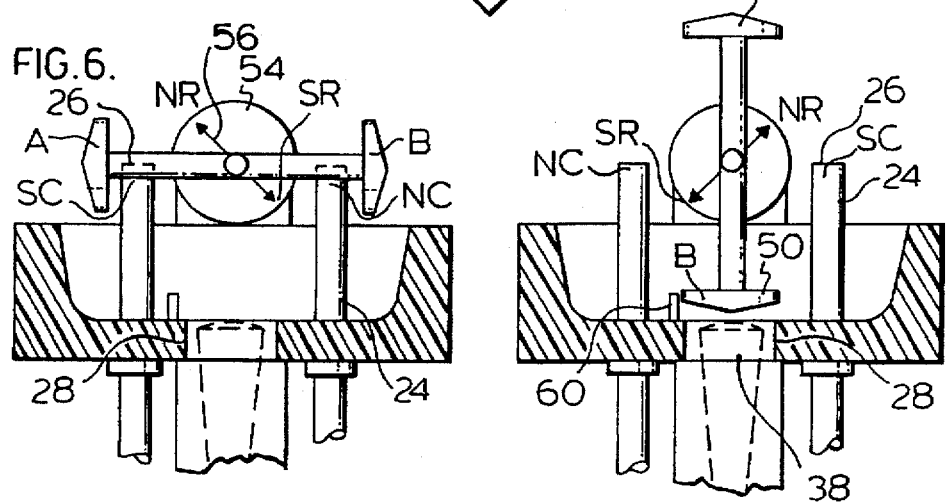
FIG. 6.
FIG. 7.

5,666,134

ELECTROMAGNETIC SHUTTER

This application is a Continuation-in-Part of application Ser. No. 07/855,063 filed Mar. 20, 1992, now U.S. Pat. No. 5,337,077, issued on Aug. 9, 1994.

This invention relates to a shutter element to move between ON and OFF positions to selectively interrupt light from an optic fibre to a viewer. The combination of shutter and optic fibre can be used in an array for display or information purposes or individually as an indicator.

The shutter element may be combined with a fibre mount and a drive for the shutter newly designed for this purpose. However it may also be used to replace an ambient light disk in mountings previously designed for ambient light disks but modified to provide an optic fibre mount.

In the latter application it is noted that there are a number of designs for diametrically mounting a disk which is (usually) electromagnetically driven to display a light or a dark face to a viewer. Examples of such designs are:

U.S. Pat. No. 3,942,274 09 Mar. 1976
U.S. Pat. No. 4,156,872 29 May 1979
U.S. Pat. No. 4,243,978 06 Jan. 1981
U.S. Pat. No. 4,577,427 25 Mar. 1986
U.S. Pat. No. 4,860,470 29 Aug. 1989

Such patents are commonly owned with this application. In such patents a disk is provided with pivotal mounting and rotated through, approximately 180°, to display a light or a dark side to the viewer. Thus the display or indicator depends on ambient light to illuminate the disk's bright side.

It is sometimes desireable to use optic fibres for display or indicator elements. Elements using such fibres usually require a shutter at the output end of the fibre to selectively provide the ON orientation (optic fibre radiation in the viewing direction) and OFF orientation (radiation interrupted in the viewing direction).

In accord with one aspect of this invention it is proposed to provide a magnet carrying shutter which may be substituted for the disk in the mount for pivotal rotation and electromagnetically driven by means associated with the mount between an ON orientation where the fibre radiation is displayed in the viewing direction and an OFF orientation where the radiation of the fibre was interrupted in the viewing direction. With the shutter in accord with the invention the pivotal mounting can be provided to correspond to that of the replaced disk and the mount need only be slightly modified to provide for approximate 90° rotation rather than approximate 180° rotation between ON and OFF positions. The drive through the changed rotation angle is achieved by selection of the magnetic axis of the magnet to allow drive by the selectively polarizable magnetic cores already present in the core design through the 90° rotation. Modification of the mount for use with the optic fibre principally involves a central bore in the rear wall of the mount through which the optic fibre projects. Such bore requires removal of a bias magnet if such was used with the disk in the rear wall. However no bias magnet is required with the (about) 90° rotation of the shutter herein.

There are, as well, advantages of the shutter intrinsic to its construction, one of the principal of which is that the shutter allows use of an optic fibre disposed centrally rather than eccentrically of the mount, in combination with a shutter which pivots transversely of the viewing direction, (as do the reversible disks) greatly contributes to the symmetry and appearance of the display or indicator.

The optic fibre end with which the invention is used will emit radiation in a diverging cone centered about a direction called the viewing direction. The cone will usually but not necessarily be a surface of revolution. The boundaries of the cone are usually defined as the surface where the radiation is one half the intensity of that on the cone's central axis. A common cone is a surface of revolution where the surface makes an angle of 7½° with the central axis. To facilitate this a lens may be incorporated into the fibre mount.

The shutter in accord with the invention is designed for use in combination with a mounted fibre end which will emit its cone of light in a given viewing direction. The invention provides a shutter comprising a frame which frames a central aperture which will allow the cone of radiation to pass when the frame is transverse to the axis of the cone. (This is known as ON orientation of the frame). The frame is provided, at diametrically opposed locations, with pivot mounting means. These will vary with the mount used but will usually comprise a pair of stub shafts designed to pivot in wells in the mount. The size of the framed aperture will of course depend on the distance of the pivotal axis from the fibre end. The frame, midway between the pivotal mountings defines a panel facing away from the pivot axis located to be adjacent to and overlie the fibre end in the OFF position of the disks. Stops will be provided, usually on the mount, to limit the rotation of the frame to the approximate 90° between ON and OFF position. A magnet is provided on the frame defining a magnetic axis transverse to the rotation axis to allow electromagnetic driving of the disk between ON and OFF positions. The magnet location, its orientation and drive may vary somewhat (but in ways obvious to those skilled in the art) to suit the magnetic core drive provided in the mount.

It is noted that the shutter of the invention may be symmetrical about the pivotal axis and symmetrical (except possibly for the magnet) about an axis perpendicular thereto. These symmetries allow the fibre end to be placed centrally of the mount, providing a symmetry to the viewer not available with other devices using fibres, and with a shutter rotatable transverse to the viewing direction. Examples of the assymetry required with other devices are indicated in U.S. Pat. No. 5,055,832 of John Browne dated Oct. 8, 1991 and U.S. Pat. No. 4,833,806 of Gars dated May 30, 1989 each describing a device having a less symmetrical appearance than this invention.

There is thus provided a shutter which, with the exception of the magnet, may be a one-piece moulding to provide in an integral piece of plastic: the frame, stub shafts and panels for application to a pre-existing mount, with a centrally located fibre and driven by its electromagnetic drive without modification other than the provision of a central aperture in the mount rear wall to receive the fibre. The novel shutter may also be applied to a specially designed mount.

The shutter, in accord with the invention, may be molded of resiliently compressible plastic so that the frame may be flexed sufficiently to relatively retract the stub shafts sufficiently to allow their insertion into the mount wells. Other advantages of the invention will be discussed in connection with the description of the preferred embodiment.

BRIEF DESCRIPTION OF THE DRAWINGS

In drawings which illustrate a preferred embodiment of the invention:

FIGS. 4 and 5 are a view from the front with the shutter in ON orientation and OFF orientation, respectively, FIGS. 6 and 7 are sectional views perpendicular to the shutter rotational axes in ON and OFF orientations, respectively.

BRIEF DESCRIPTION OF THE PREFERRED EMBODIMENT

Figure 1:
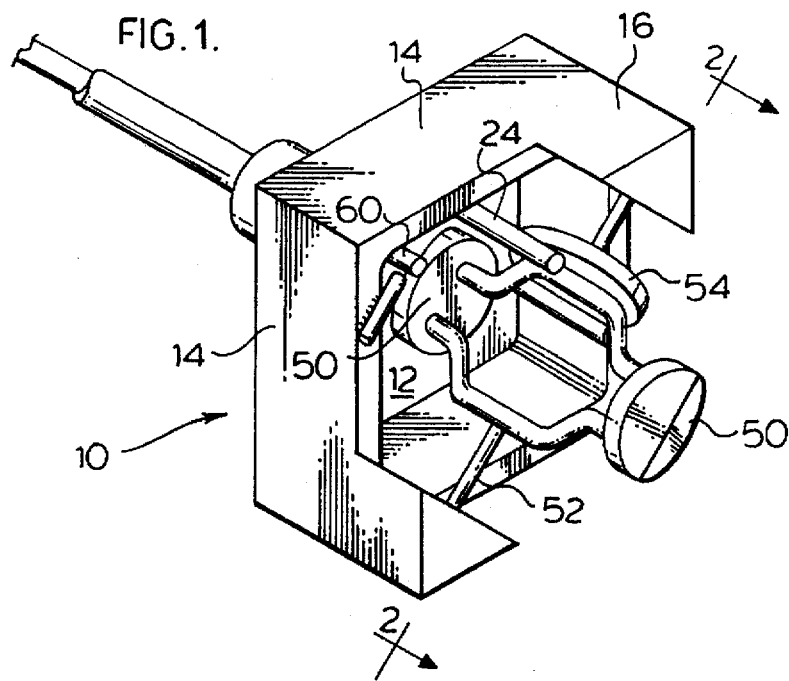
FIG. 1 is a perspective view of a shutter and mount in accord with the invention, with the shutter in OFF orientation.
Figure 2:
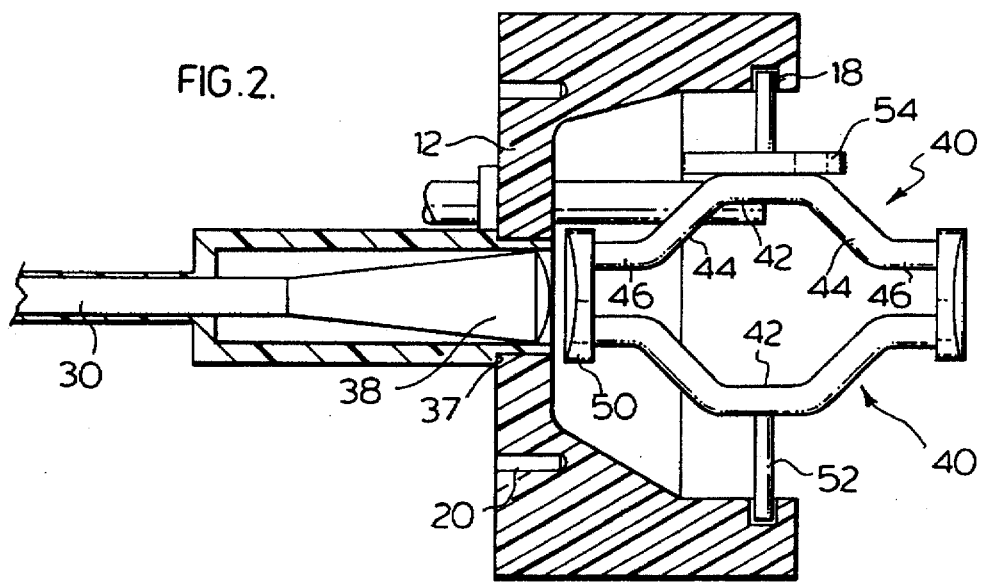
FIG. 2 is a sectional view along the lines 2—2 of FIG. 1.
Figure 3:
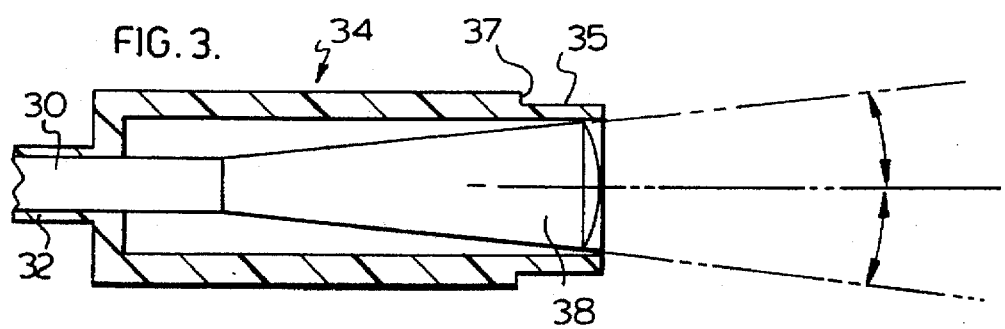
FIG. 3 is an enlarged sectional view of the optic fibre and mount.

FIG. 1 shows a square mount 10 having a rear wall 12, side walls 14 and, at diagonally opposite corners forwardly (i.e. toward the viewer) extending standards 16. The standards 16 are provided with mutually facing wells 18. Bores 20 (or alternative means) in the rear wall allow mounting of the mount on a base support. Displaced from the centre of the rear wall 12 and symmetrically disposed on each side of the diagonal joining standards 16, are magnetizable cores 24 which project forwardly to ends 26 at a forward location corresponding to the shutter rotary axis as best shown in FIG. 7. The magnetic cores 24 are preferably of high remanence material and may be selectively magnetized in the desired mutually opposing polarities by windings not shown. To operate the magnetic drive the polarities are switched. The mount shown may be used singly, in an array, or in a strip of elements to be combined in an array. Thus the mount as described so far is similar to that shown in U.S. Pat. No. 3,942,274 dated Mar. 9, 1976 and commonly owned with this application (although the cores projecting into the mount as shown may be differently energized). The usage of such cores in U.S. Pat. No. 3,942,274 is of course to drive a disk through 180° whereas in this application the disk will be replaced with a shutter rotated through about 90°.

The mount as described is modified over that used with disks and shown in the patent by the added provision of an aperture 28 centrally located in the rear wall as viewed from the front.

An optic fibre 30 is contained in a plastic sleeve 32 terminating in an enlarged plastic ferrule 34. Inside the plastic sleeve the fibre will typically terminate in a lens 38 also referred to as the 'fibre end' which will define the cone of light emitted. The cone included angle will vary with differing uses but for use in displays for the attention of the drivers of motor vehicles, the preferred angle is 7½° to the central axis, that is an included angle of 15°. The plastic ferrule 34 is shaped to provide a forward portion 35 designed to make a close frictional fit with the edges of aperture 28, and a rearward thicker portion defining a forwardly facing shoulder 37. Thus the direction of the beam from the fiber is controlled by the fit of portion 35 resting on the edge of aperture 28 and shoulder 37 bearing on the rear surface of rear wall 12.

The shutter comprises spaced frame members 40 extending transverse to the rotary axis. The members 40 are relatively closely spaced at each end extent 46 but diverge at about 45° with extents 44 to widely spaced central extents 42. It will be seen that the extent 42, and the two extents 44 on each frame member define approximately 6 sides of an octagon and frame an area 48 for emission of the light from lens or fibre end 36 in the ON position of the shutter. It will also be noted that the narrowing at the 45° extents 44 avoids interference between the shutter and cores 24 in rotation of the shutter. At each end, the frame members 46 terminate in panels 50 which are shaped and located to occlude the rays from fibre end 38 in the OFF position of the shutter.

Midway along frame central extents 42, the unitary moulding which includes the shutter members described herein, extends outwardly into stub shafts 52 designed to seat and rotate in wells 18 to be described.

A circular magnet 54 of material magnetizable diametrically has a central bore and is applied by friction to one of the stub shafts 52 adjacent the cores 24. The magnet 54 defines a magnetic axis 56 poled NR-SR as indicated.

It should here be noted that the shutter is balanced and provided with two way symmetry about the pivotal axis defined by stub shafts 52 for better disk operation. The shutter is also, with the exception of the magnet, symmetrical about a plane perpendicular to the pivot axis midway between the stub shafts 52. Thus the octagon partially framed by the members 42, and the two members 44, on each side, provides an opening, in the ON position, for passage of the circular section 48 of the conical beam from fibre end or lens 38 which is central to the rear wall 12. (FIG. 4).

It is noted that the frame members 42, 44, 46 as with the shutter as a whole are made of resilient plastic so that, to mount the shutter, the opposed members 42 may be manually (or by machine) squeezed together to relatively retract stub shafts 52 sufficiently to allow their alignment with wells 18 and relaxation of this compression allows the stub shafts to seat in the wells to allow pivotal rotation.

The magnet is preferably made from plastic bonded ferrite and may be such product manufactured under the trademark KOROSEAL made by RJF International, P.O. Box 5235 N of Cleveland Ohio or under the trademark STABON made by Stackpole Corporation Magnet Division, 700 Elk Ave Kane Pa. The magnet is preferably magnetized in the polarities indicated by north—south poles NR-SR at 45° clockwise from the plane of the shutter as best shown in FIGS. 6 and 7. This will be the position of the shutter when the core ends north NC and south SC are selectively magnetized as shown with each core end 26 attracting a pole of the shutter magnet.

Stop 60 shown projecting from rear wall 12 limits further clockwise movement of the disk when it reaches the OFF position, as viewed in FIG. 7. It will be noted that, in OFF position the panel 50 interrupts all rays of the cone from fibre end 38. It will be noted that in the particular model shown the panel 50 is outwardly bevelled, as shown in axial view in FIG. 7 to clear the forward edges of side walls 14.

With the disk in the OFF position, when the polarity NC, SC of cores 24 is reversed from that shown in FIG. 7 the poles NR, SR of the shutter magnet 54 are repelled and the shutter rotates counter clockwise to the ON position shown in FIG. 6 where stop 62, projecting from side wall 14 limits further counter clockwise rotation of the shutter. The shutter has thus rotated 90° to the ON position where, as shown in FIG. 6 the circular section 48 of the diverging cone of light from lens 36 is, at the frame entirely within aperture partially framed by members 42, 44, 46 and at hence all allowed to pass to potential viewers.

It will be noted that in using the former disk housing for a disk element, the magnet axis NR-SR of magnet 54 (see FIGS. 4 and 5) is axially displaced from the line joining cores 24. The small skew caused by this non-alignment has negligible effect on the operation of the disk and the arrangement shown has the advantage that it increases the spacing between the core and shutter magnets. It is noted that if the shutter magnet 54 comes too close to the core ends 26 the magnet may tend to override the remanent magnetism of the cores 24 in which event magnet 54 will 'latch' or modify the magnetism of cores 24 and will not switch when the cores are reversed.

In operation, with the shutter in OFF position as shown in FIG. 5, panel 50 blocks the cone of light from fibre end 38 so that the cone of light is interrupted and does not reach the intended viewer. The polarities NC-SC of the core magnets shown in FIG. 7 attract the poles NR, SR of the rotary magnet to maintain this position. To switch the shutter to the ON position the core energising windings (not shown) are pulsed to reverse the polarity of the core poles. Such polarity reversal drives the shutter magnet and the shutter, counter clockwise 90° to the position shown in FIG. 6 (see also FIG. 4) and is there stopped by stop 62 where the shutter frame allows the cone of light from fibre end 38 to reach the viewer as clearly demonstrated by FIG. 4 where the cone of light represented by circle 48 is within the frame of the shutter.

To return the shutter to the OFF position the cores are again reversed in polarity causing the shutter to rotate clockwise until it contacts stop 60 to again place the shutter in the OFF position (FIGS. 5 and 7).

Although the preferred embodiment shows two cores 24 for the electromagnetic drive, other known methods of causing the desired rotation of the shutter are within the scope of the invention. For example, U.S. Pat. No. 4,156,872, referred to above shows a single core method of driving a magnet bearing disk through 180°, which may be easily modified to drive a shutter through 90°.

Figure 8:
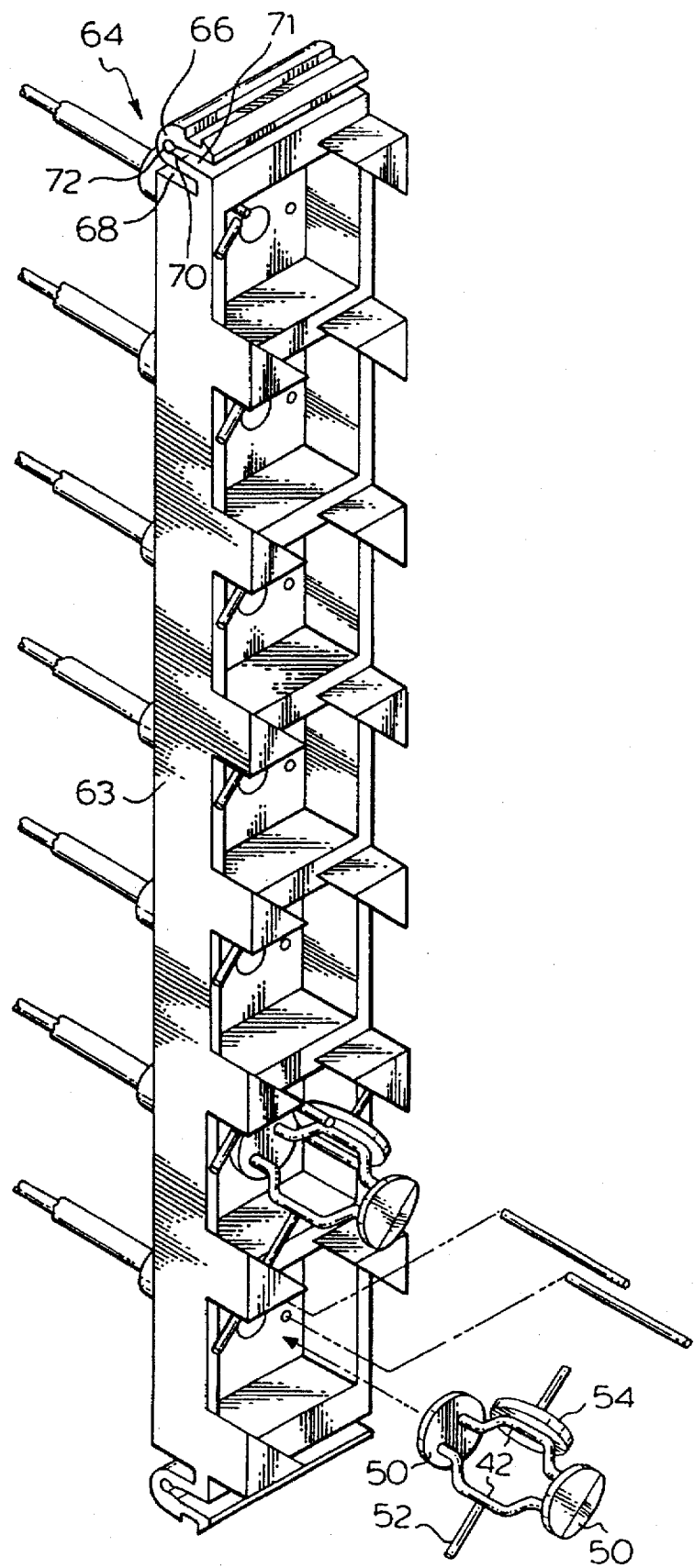
FIG. 8 is a perspective view showing the combination of a plurality of shutter elements and a strip module.

FIG. 8 shows the combination of a plurality of the shutters and mounts as described herein in a strip module 63 which mounts two or more shutters (7 is the most common number), in a single row. Such a strip module is shown in U.S. Pat. No. 3,942,274 dated Mar. 9, 1976 and commonly owned with this application and incorporated herein by reference. In the patent the strip module is designed for mounting a line of pivotally mounted disks and coupling means are provided at each end of the strip module to allow its mounting with other strip modules, side by side, in an array.

The strip module as shown in FIG. 8 differs from that shown in the U.S. Pat. No. 3,942,274 in that it mounts a plurality (here 7) of aligned shutters, the shutters and mounts being designed as disclosed in FIGS. 1–7, except that the mounts 10 are integrally connected and designed to form part of a single moulding. The strip module is similar to that shown in the patent in that it is designed to extend in a longitudinal direction and mount a single row of such shutter elements and in that it is provided at each end with an extremity 64 extending rearwardly, about a 180° hairpin curve 66 and then forwardly, being located endwise from the module. The extremity, thus curved, defines a forwardly extending slot 71 designed to receive a coupling member (not shown) extending transver to the strip module through and on each side of the slot 71 and inserted forwardly into the slot. The outer end of the slot is wide enough to receive the relevant dimension of a rod-like member, tapers somewhat into a constricted portion 70 and widens at its innermost end into a space 72 to receive the rod-like member. The material forming the hairpin 66 and the adjacent extents is made slightly resiliently yieldable and is made thin enough to allow this while a rearwardly directed slot 68 is provided, open to the rear of the strip module, separating the material from the body of the strip module, to add to its resilient yieldability.

The coupling of a plurality of strip modules side by side in an array may thus be performed as discussed in U.S. Pat. No. 3,942,274. The coupling means at each end of the strip module may be varied as desired.

With the strip module as shown in FIG. 8 each of seven aligned and integrally connected shutter mounts 10 is provided with a central (to the mount rear wall 12) optic fibre (see end 38) and a shutter mounted and constructed as shown in FIGS. 1–7. The optic fibre ends 38 are aligned in the longitudinal direction and central to the back wall of their mounts and define respective viewing directions which are substantially parallel and which each define an outwardly diverging cone as demonstrated in FIG. 3. The electromagnetic drive using cores 24 may be designed to selectively drive each of the shutters individually in the same manner as the drive demonstrated in FIGS. 6 and 7, so that the seven shutters may each be in an individually selected ON or OFF position. The pivotal axes of the shutters are preferably arranged at about 45° to the longitudinal direction, as shown. The shutters are constructed and mounted in the same manner as those of FIGS. 1–7.

I claim:

1. Strip module extending in a longitudinal direction, in combination with a plurality of optic fibre emission shutter elements comprising:

a housing extending in said longitudinal direction including means for mounting at least two rotatable shutter elements, said housing mounting, for each shutter element, an optic fibre, having an end, thereby defining a viewing direction, and a cone of light about said viewing direction, diverging in said viewing direction, said viewing direction for respective optic fibres being substantially parallel, said optic fibre ends being substantially aligned in said longitudinal direction, means, corresponding to each of said optic fibres, for mounting a rotary shutter element on a pivotal axis transverse to said viewing direction, means for selectively driving each said rotary shutter element between ON and OFF positions, said shutter, in the ON position, allowing the passage of light in said cone, and said shutter having a panel, movable therewith, positioned to be located between and substantially in alignment with said pivotal axis and said fibre end, in the OFF position, said panel being dimensioned to occlude said cone, in the viewing direction when said panel is in said OFF position.

2. A strip module as claimed in claim 1 wherein said housing includes a pair of uprights corresponding to each shutter element, extending in the viewing direction, each shutter element being pivotably mounted on said uprights.

3. A strip module as claimed in claim 1 wherein each said shutter includes opposed outwardly directed stub shafts, substantially coinciding with the shutter pivotal axis, wherein each of said mounting means includes a pair of mutually facing wells, adapted to rotatably receive said stub shafts, and wherein each said shutter is resiliently compressible in an axial direction, whereby each said shutter may be axially compressed and expanded to allow said stub shafts to be inserted in said wells.

4. A strip module as claimed in claim 2 wherein each said shutter includes opposed outwardly directed stub shafts, substantially conciding with the shutter pivotal axis, wherein each pair of uprights is provided with mutually facing wells, adapted to rotatably receive said stub shafts, and wherein each said shutter is resiliently compressible in an axial direction, whereby each said shutter may be axially compressed and expanded to allow said stub shafts to be inserted in said wells.

5. A strip module, as claimed in claim 1 wherein said housing includes a rear wall, each said optic fibre is mounted in an aperture in said rear wall to define a viewing direction substantially intersecting the pivotal axis.

6. A strip module, as claimed in claim 2 wherein said housing includes a rear wall, each said optic fibre is mounted in an aperture in said rear wall to define a viewing direction substantially intersecting the pivotal axis.

7. A strip module as claimed in claim 5 wherein said viewing direction intersects the pivotal axis midway between said mounting means.

8. A strip module as claimed in claim 6 wherein said viewing direction intersects the pivotal axis midway between said mounting means.

9. A strip module as claimed in claim 1 wherein said pivotal axes are oriented at about 45° to said longitudinal direction.

10. A strip module as claimed in claim 2 wherein said pivotal axes are oriented at about 45° to said longitudinal direction.

11. A strip module as claimed in claim 3 wherein said pivotal axes are oriented at about 45° to said longitudinal direction.

12. A strip module as claimed in claim 4 wherein said pivotal axes are oriented at about 45° to said longitudinal direction.

13. A strip module as claimed in claim 5 wherein said pivotal axes are oriented at about 45° to said longitudinal direction.

14. A strip module as claimed in claim 6 wherein said pivotal axes are oriented at about 45° to said longitudinal direction.

15. A strip module as claimed in claim 7 wherein said pivotal axes are oriented at about 45° to said longitudinal direction.

16. A strip module as claimed in claim 8 wherein said pivotal axes are oriented at about 45° to said longitudinal direction.

17. Shutter for optic fibre emission on a cone about a selected viewing direction, comprising:

means for mounting an optic fibre having an end thereby defining the viewing direction and a cone of light about said viewing direction emitted from said fibre end, means for mounting a rotary shutter on a pivotal axis transverse to said viewing direction, means for selectively driving said rotary shutter element between ON and OFF positions, said shutter, in the ON position, allowing the passage of light in said cone, and said shutter mounting a panel, movable therewith, positioned to be located between and substantially in alignment with said pivotal axis and said fibre end, in the OFF position, said panel being dimensioned to occlude said cone, in the viewing direction when said panel is in said OFF position.

18. A shutter, as claimed in claim 17, wherein said pivotal axis is located in said viewing direction from said fibre end.

19. A shutter as claimed in claim 17 wherein said shutter includes opposed outwardly directed stub shafts substantially coinciding with said pivotal axis, wherein said mounting means includes a pair of facing wells, adapted to rotatably receive said stub shafts, and wherein said shutter is resiliently compressible in an axial direction whereby said shutter may be axially compressed and expanded to allow said stub shafts to be inserted in said wells.

* * * * *